(12) United States Patent
Coates et al.

(10) Patent No.: US 10,927,669 B2
(45) Date of Patent: Feb. 23, 2021

(54) TRANSDUCER RINGING

(71) Applicant: Halliburton Energy Services, Inc., Houston, TX (US)

(72) Inventors: Richard Timothy Coates, Katy, TX (US); Peng Li, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/600,182

(22) Filed: Oct. 11, 2019

(65) Prior Publication Data

US 2020/0123897 A1 Apr. 23, 2020

Related U.S. Application Data

(60) Provisional application No. 62/746,836, filed on Oct. 17, 2018.

(51) Int. Cl.
| | |
|---|---|
| *E21B 47/14* | (2006.01) |
| *G01V 1/50* | (2006.01) |
| *G01V 1/30* | (2006.01) |
| *E21B 47/06* | (2012.01) |

(Continued)

(52) U.S. Cl.
CPC ............ *E21B 47/14* (2013.01); *B06B 1/0644* (2013.01); *E21B 47/0224* (2020.05); *E21B 47/06* (2013.01); *G01V 1/30* (2013.01); *G01V 1/50* (2013.01); *G01V 2210/324* (2013.01)

(58) Field of Classification Search
CPC .... E21B 47/14; E21B 47/005; E21B 47/0224; E21B 47/06; B06B 1/0644; G01V 1/30; G01V 1/50; G01V 1/48; G01V 2210/324; G01V 2210/32; G01V 2210/3246; H04B 15/02; H04B 1/10

See application file for complete search history.

(56) References Cited

U.S. PATENT DOCUMENTS

| | | |
|---|---|---|
| 4,210,967 A | 7/1980 | Ingram |
| 6,897,651 B2 | 5/2005 | Reiderman et al. |
| 8,682,102 B2 | 3/2014 | Sugiura et al. |

(Continued)

OTHER PUBLICATIONS

International Search Report and Written Opinion for Application PCT/US2019/056131 dated Jan. 30, 2020.

*Primary Examiner* — Franklin D Balseca
(74) *Attorney, Agent, or Firm* — Benjamin Ford; C. Tumey Law Group PLLC

(57) ABSTRACT

A method and system for reducing transducer ringing. The method may comprise identifying a first set of waveforms and a second set of waveforms from recorded waveforms taken by a transducer, estimating an invariant component for each waveform in the first set of waveforms, and subtracting the invariant component from the second set of waveforms. The system may comprise a downhole tool. The downhole tool may comprise at least one transducer and wherein the at least one transducer is configured to emit an excitation and record a plurality of waveforms. The system may further comprise an information handling system configured to identify a first set of waveforms and a second set of waveforms from the plurality of waveforms from the at least one transducer, estimate an invariant component for each waveform in the first set of waveforms, and subtract the invariant component from the second set of waveforms.

20 Claims, 7 Drawing Sheets

(51) Int. Cl.
  *B06B 1/06*       (2006.01)
  *E21B 47/0224*    (2012.01)

(56) References Cited

U.S. PATENT DOCUMENTS

| | | | |
|---|---|---|---|
| 9,513,372 B2 * | 12/2016 | Valero | G01S 15/006 |
| 9,927,542 B2 * | 3/2018 | Tracadas | G01V 1/48 |
| 10,222,501 B2 * | 3/2019 | Zhang | G01V 1/50 |
| 10,273,797 B2 * | 4/2019 | Li | E21B 47/14 |
| 2010/0265796 A1 | 10/2010 | Steinsiek et al. | |
| 2016/0018549 A1 | 1/2016 | Tracadas | |
| 2017/0115423 A1 | 4/2017 | Hori et al. | |
| 2020/0088898 A1 * | 3/2020 | Zhang | G01V 1/345 |

* cited by examiner

TRANSDUCER RINGING

BACKGROUND

Wellbores drilled into subterranean formations may enable recovery of desirable fluids (e.g., hydrocarbons) using any number of different techniques. Currently, properties of subterranean formations surrounding the borehole may be determined using measurements made with suitable sensors mounted on the bottom hole assembly behind the drill bit. Measurement operations performed by downhole logging tools may identify properties within a wellbore and/or inside a formation. Current methods and system for downhole logging may emit an excitation into a wellbore, record a reflection, and process the reflection to determine wellbore properties. When the pressure pulse is created and recorded by the same transducer creating a pressure pulse may also create "ringing" in the transducer. Recording "ringing" may skew data measurements.

Transducers suffer from significant ringing after they have been energized. This internal ringing acts as a source of noise which makes identifying reflection echoes and picking their arrival times and amplitudes hard to implement. A common solution to this problem is simply to mute the early time data, which implies that arrivals within the mute window are not detected and a significant number of false detections are made at the time corresponding to the end of the mute window.

Further complicating this problem is the fact that the downhole computational hardware available make storing and then accessing significant amounts of data prohibitively expensive. This places a severe constraint on the type of signal processing algorithms which can be implemented. The transducer ringing may also change with the downhole logging environment (pressure and temperature), which may make effective ringing removal harder to achieve with simple algorithms.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to a system and method of a bottom hole assembly measurement system that are configured for the estimation and application of a filter designed to remove transducer ringing from measured data.

Figure 1:
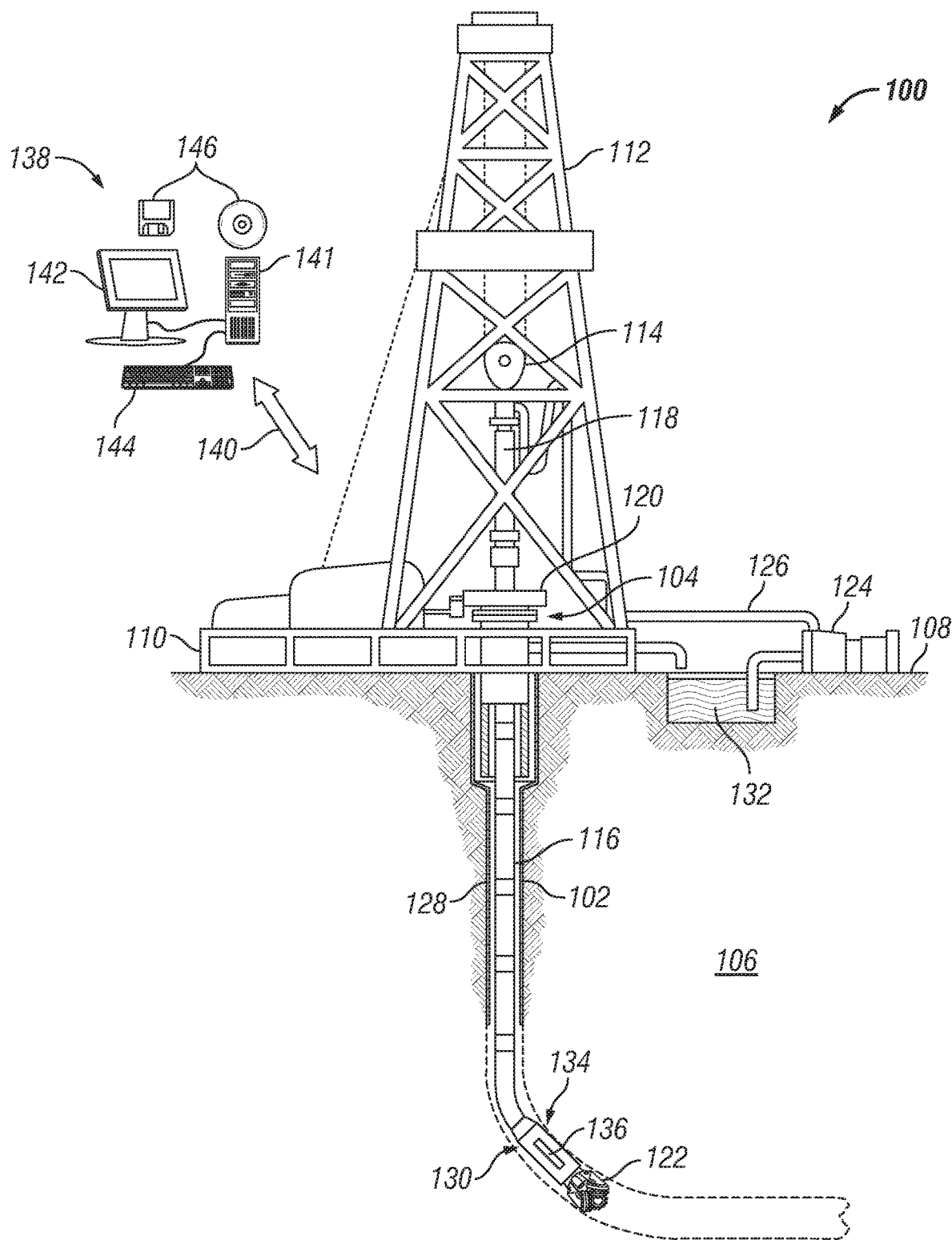
FIG. 1 illustrates an example of a drilling system.

FIG. 1 illustrates an example of drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 may include a metallic member. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extend generally vertically into the subterranean formation 106, however, wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depicts land-based operations, those skilled in the art may recognize that the principles described herein are equally applicable to subsea operations that employ floating or sea-based platforms and rigs, without departing from the scope of the disclosure.

As illustrated, a drilling platform 110 may support a derrick 112 having a traveling block 114 for raising and lowering drill string 116. Drill string 116 may include, but is not limited to, drill pipe and coiled tubing, as generally known to those skilled in the art. A kelly 118 may support drill string 116 as it may be lowered through a rotary table 120. A drill bit 122 may be attached to the distal end of drill string 116 and may be driven either by a downhole motor and/or via rotation of drill string 116 from surface 108. Without limitation, drill bit 122 may include, roller cone bits, PDC bits, natural diamond bits, any hole openers, reamers, coring bits, and the like. As drill bit 122 rotates, it may create and extend wellbore 102 that penetrates various subterranean formations 106. A pump 124 may circulate drilling fluid through a feed pipe 126 through kelly 118, downhole through interior of drill string 116, through orifices in drill bit 122, back to surface 108 via annulus 128 surrounding drill string 116, and into a retention pit 132.

With continued reference to FIG. 1, drill string 116 may begin at wellhead 104 and may traverse wellbore 102. Drill bit 122 may be attached to a distal end of drill string 116 and may be driven, for example, either by a downhole motor and/or via rotation of drill string 116 from surface 108. Drill bit 122 may be a part of bottom hole assembly 130 at distal end of drill string 116. Bottom hole assembly 130 may further include tools for look-ahead resistivity applications. As will be appreciated by those of ordinary skill in the art, bottom hole assembly 130 may be a measurement-while drilling (MWD) or logging-while-drilling (LWD) system.

Bottom hole assembly 130 may include any number of tools, transmitters, and/or receivers to perform downhole measurement operations. For example, as illustrated in FIG. 1, bottom hole assembly 130 may include a measurement assembly 134. It should be noted that measurement assembly 134 may make up at least a part of bottom hole assembly 130. Without limitation, any number of different measurement assemblies, communication assemblies, battery assemblies, and/or the like may form bottom hole assembly 130 with measurement assembly 134. Additionally, measurement assembly 134 may form bottom hole assembly 130 itself. In examples, measurement assembly 134 may include at least one transducer 136, which may be disposed at the surface of measurement assembly 134. It should be noted that transducer 136 may also be referred to as a "pinger" and/or a transducer.

Without limitation, bottom hole assembly 130 may be connected to and/or controlled by information handling system 138, which may be disposed on surface 108. Without limitation, information handling system 138 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 138 that may be disposed down hole may be stored until bottom hole assembly 130 may be brought to surface 108. In examples, information handling system 138 may communicate with bottom hole assembly 130 through a communication line (not illustrated) disposed in (or on) drill string 116. In examples, wireless communication may be used to transmit information back and forth between information handling system 138 and bottom hole assembly 130. Information handling system 138 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter, and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. At surface 108, pressure transducers (not shown) may convert the pressure signal into electrical signals for a digitizer (not illustrated). The digitizer may supply a digital form of the telemetry signals to information handling system 138 via a communication link 140, which may be a wired or wireless link. The telemetry data may be analyzed and processed by information handling system 138.

As illustrated, communication link 140 (which may be wired or wireless, for example) may be provided that may transmit data from bottom hole assembly 130 to an information handling system 138 at surface 108. Information handling system 138 may include a personal computer 141, a video display 142, a keyboard 144 (i.e., other input devices.), and/or non-transitory computer-readable media 146 (e.g., optical disks, magnetic disks) that can store code representative of the methods described herein. In addition to, or in place of processing at surface 108, processing may occur downhole.

As discussed below, methods may be utilized by information handling system 138 to determine properties of subterranean formation 106. Information may be utilized to produce an image, which may be generated into a two or three-dimensional models of subterranean formation 106. These models may be used for well planning, (e.g., to design a desired path of wellbore 102). Additionally, they may be used for planning the placement of drilling systems within a prescribed area. This may allow for the most efficient drilling operations to reach a subsurface structure. During drilling operations, measurements taken within wellbore 102 may be used to adjust the geometry of wellbore 102 in real time to reach a geological target. Measurements collected from bottom hole assembly 130 of the formation properties may be used to steer drilling system 100 toward a subterranean formation 106.

Figure 2:
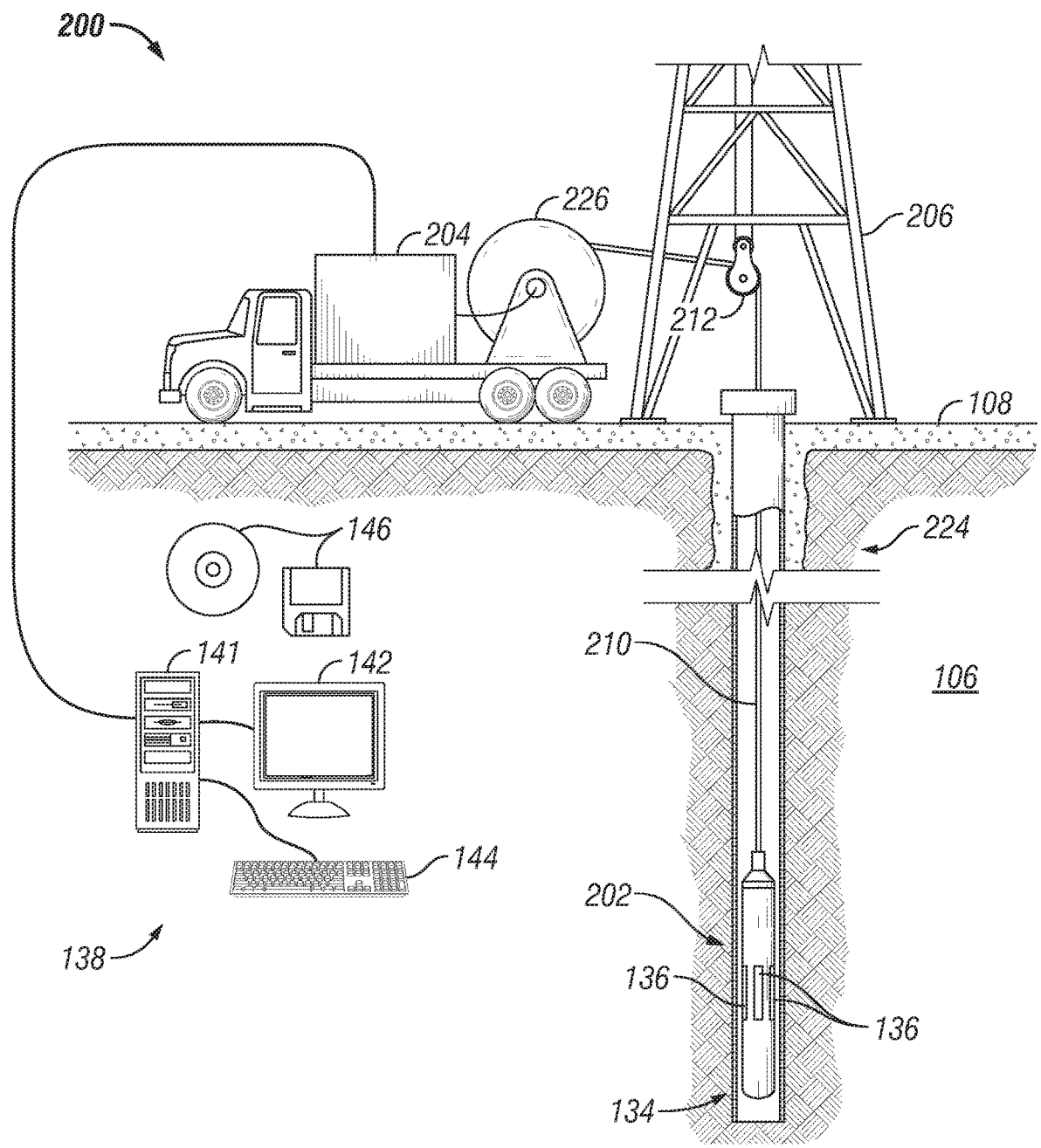
FIG. 2 illustrates an example of a well measurement system.

FIG. 2 illustrates a cross-sectional view of an example of well measurement system 200. As illustrated, well measurement system 200 may comprise downhole tool 202 attached a vehicle 204. In examples, it should be noted that downhole tool 202 may not be attached to a vehicle 204. Downhole tool 202 may be supported by rig 206 at surface 108. Downhole tool 202 may be tethered to vehicle 204 through conveyance 210. Conveyance 210 may be disposed around one or more sheave wheels 212 to vehicle 204. Conveyance 210 may include any suitable means for providing mechanical conveyance for downhole tool 202, including, but not limited to, wireline, slickline, coiled tubing, pipe, drill pipe, downhole tractor, or the like. In some embodiments, conveyance 210 may provide mechanical suspension, as well as electrical and/or optical connectivity, for downhole tool 202. Conveyance 210 may comprise, in some instances, a plurality of electrical conductors and/or a plurality of optical conductors extending from vehicle 204, which may provide power and telemetry. In examples, an optical conductor may utilize a battery and/or a photo conductor to harvest optical power transmitted from surface 108. Conveyance 210 may comprise an inner core of seven electrical conductors covered by an insulating wrap. An inner and outer steel armor sheath may be wrapped in a helix in opposite directions around the conductors. The electrical and/or optical conductors may be used for communicating power and telemetry between vehicle 204 and downhole tool 202. Information from downhole tool 202 may be gathered and/or processed by information handling system 138. For example, signals recorded by downhole tool 202 may be stored on memory and then processed by downhole tool 202. The processing may be performed real-time during data acquisition or after recovery of downhole tool 202. Processing may alternatively occur downhole or may occur both downhole and at surface. In some embodiments, signals recorded by downhole tool 202 may be conducted to information handling system 138 by way of conveyance 210. Information handling system 138 may process the signals, and the information contained therein may be displayed for an operator to observe and stored for future processing and reference. Information handling system 138 may also contain an apparatus for supplying control signals and power to downhole tool 202.

Systems and methods of the present disclosure may be implemented, at least in part, with information handling system 138. While shown at surface 108, information handling system 138 may also be located at another location, such as remote from borehole 224. Information handling system 138 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 138 may be a personal computer 141, a network storage device, or any other suitable device and may vary in size, shape, performance, functionality, and price. Information handling system 138 may include random access memory (RAM), one or more processing resources such as a central processing unit (CPU) or hardware or software control logic, ROM, and/or other types of nonvolatile memory. Additional components of the information handling system 138 may include one or more disk drives, one or more network ports for communication with external devices as well as various input and output (I/O) devices, such as a keyboard 144, a mouse, and a video display 142. Information handling system 138 may also include one or more buses operable to transmit communications between the various hardware components. Furthermore, video display 142 may provide an image to a user based on activities performed by personal computer 141. For example, producing images of geological structures created from recorded signals. By way of example, video display unit may produce a plot of depth versus the two cross-axial components of the gravitational field and versus the axial component in borehole coordinates. The same plot may be produced in coordinates fixed to the Earth, such as coordinates directed to the North, East and directly downhole (Vertical) from the point of entry to the borehole. A plot of overall (average) density versus depth in borehole or vertical coordinates may also be provided. A plot of density versus distance and direction from the borehole versus vertical depth may be provided. It should be understood that many other types of plots are possible when the actual position of the measurement point in North, East and Vertical coordinates is taken into account. Additionally, hard copies of the plots may be produced in paper logs for further use.

Alternatively, systems and methods of the present disclosure may be implemented, at least in part, with non-transitory computer-readable media 146. Non-transitory computer-readable media 146 may include any instrumentality or aggregation of instrumentalities that may retain data and/or instructions for a period of time. Non-transitory computer-readable media 146 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of borehole 224. Information handling system 138 may comprise a safety valve (not illustrated) which controls the hydraulic pressure that drives drum 226 on vehicle 204 which may reel up and/or release conveyance 210 which may move downhole tool 202 up and/or down borehole 224. The safety valve may be adjusted to a pressure such that drum 226 may only impart a small amount of tension to conveyance 210 over and above the tension necessary to retrieve conveyance 210 and/or downhole tool 202 from borehole 224. The safety valve is typically set a few hundred pounds above the amount of desired safe pull on conveyance 210 such that once that limit is exceeded, further pull on conveyance 210 may be prevented.

As illustrated in FIG. 2, downhole tool 202 may include measurement assembly 134. It should be noted that measurement assembly 134 may make up at least a part of downhole tool 202. Without limitation, any number of different measurement assemblies, communication assemblies, battery assemblies, and/or the like may form downhole tool 202 with measurement assembly 134. Additionally, measurement assembly 134 may form downhole tool 202 itself. In examples, measurement assembly 134 may include any number of transducers 136, which may be disposed at or near the surface of measurement assembly 134. Without limitation, there may be four transducers 136 that may be disposed ninety degrees from each other. However, it should be noted that there may be any number of transducers 136 disposed along bottom hole assembly 130 at any degree from each other.

Figure 3:
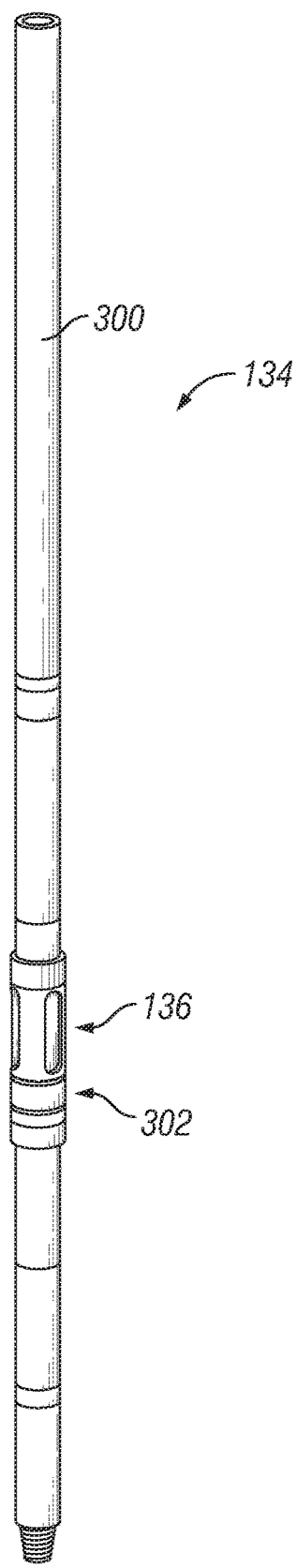
FIG. 3 illustrates an example of a measurement assembly.

FIG. 3 illustrates a close up view of an example of measurement assembly 134. As illustrated, measurement assembly 134 may include at least one battery section 300 and at least one instrument section 302. Battery section 300 may operate and function to enclose and/or protect at least one battery that may be disposed in battery section 300. Without limitation, battery section 300 may also operate and function to power measurement assembly 134. Specifically, battery section 300 may power at least one transducer 136, which may be disposed at any end of battery section 300 in instrument section 302.

Instrument section 302 may house at least one transducer 136. Transducers 136 may function and operate to generate and record excitations within a borehole. For example, during operations, transducer 136 may transmit an excitation into wellbore 102 (e.g., referring to FIG. 1). Without limitation, the excitation may be in the form of a pressure pulse, current, electromagnetic field, radio frequency, and/or any other suitable medium. This may allow for transducer 136 to be an ultrasonic device, acoustic device, electromagnetic device, radio frequency device, and/or the like. In examples, may be made of piezo-ceramic crystals, or optionally magnetostrictive materials or other materials that generate an acoustic pulse when activated electrically or otherwise. In one or more examples, transducers 136 may also include backing materials and matching layers. Additionally, transducer 136 may include coils, antennas, and/or the like. It should be noted that transducers 136 and/or instrument section 302 may be removable and replaceable, for example, in the event of damage or failure.

During operations, in examples where transducer 136 may emit a pressure wave, specifically an ultrasonic pressure pulse wave, the pressure pulse may have a frequency range from 50 kHz~500 kHz, center around 250 kHz. It should be noted that the pulse signal may be emitted with different frequency content. Recordings and/or measurements taken by transducer 136 may be transmitted to information handling system 138 by any suitable means, as discussed above. Transmission may be performed in real-time (transmitted to the surface via mud- pulse, wired-pipe or other telemetry) or post-drill (from data stored in the tool memory and recovered at the surface during tripping).

In examples, transducers 136 may further sense and record the transmission of the excitation. The excitation may travel from transducer 136 and reflect off a borehole wall. The reflected excitation is defined as an echo, which is recorded by transducer 136. Without limitation, transducers 136 may measure the excitation as it travels from transducer 136 and is reflected back to transducer 136 as an echo.

Measurements may be used to form images of the surrounding borehole and/or subterranean formation. To generate these images, measurement assembly 134 may utilize one or more transducers 136 positioned at varying azimuths around the circumference of measurement assembly 134. In examples, each transducer 136 may operate and function independently emitting an excitation and detecting its reflection from the borehole wall as a reflected echo.

Figure 4:
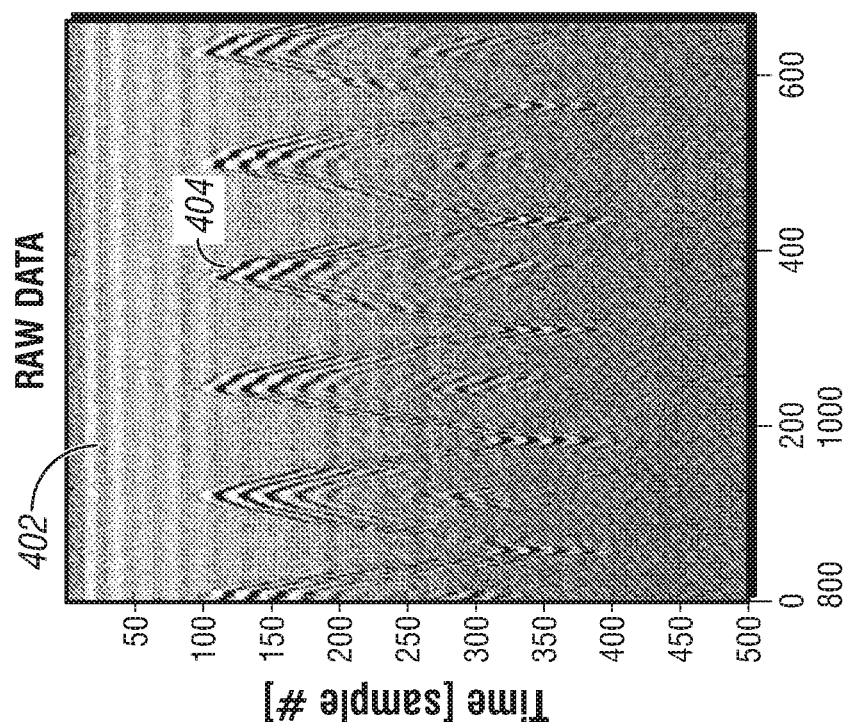
FIG. 4 is a graph of raw measurement data that includes measured ringing in accordance with particular embodiments.

FIG. 4 illustrates an example of the raw data acquired downhole before applying a filter. Within FIGS. 4 are transducer ring-down 402, manifested as horizontal stripes, and reflection echoes 404. As illustrated, the recorded amplitude of each reflection echo 404 may be shown as a variable density display with light colors denoting large positive voltage amplitudes and dark colors large negative voltage amplitudes. FIG. 4 shows the recordings from many firings of transducer 136 displayed side-by-side. Recording time after transducer firing runs vertically with zero at the top. Firing number rungs horizontally with early firings to the left and later firings to the right.

Figure 5:
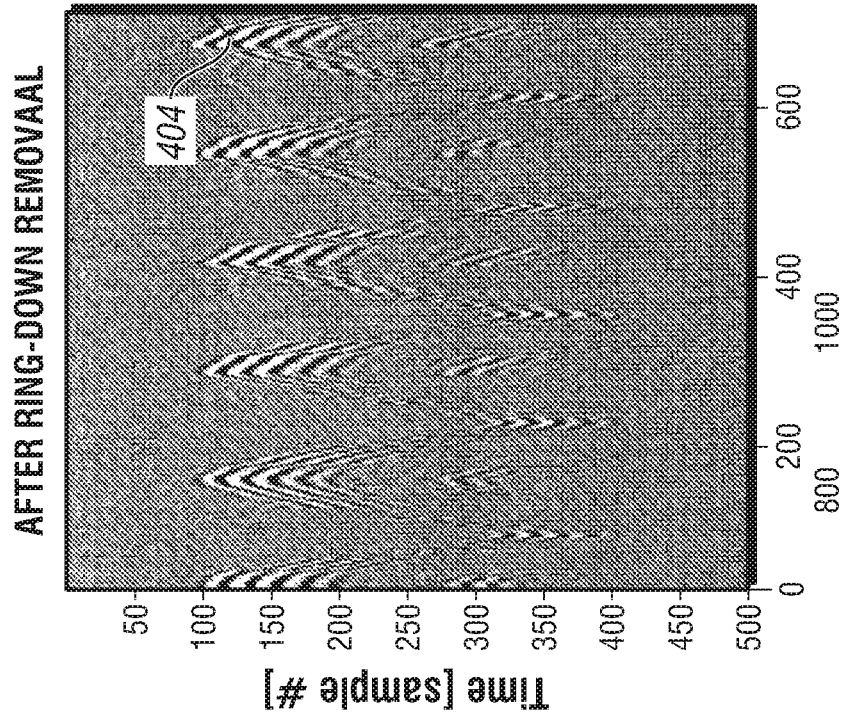
FIG. 5 is a graph of the measurement data after the ringing has been removed in accordance with particular embodiments.

FIG. 5 illustrates an example of the raw data acquired downhole after applying a filter to remove recorded "ringing." FIG. 4 illustrates that ring-down 402 may be extremely regular, while reflection echoes 404 may vary. It should be noted that ring-down 402 may vary over longer time periods due to changes in pressure or temperature, changes in the drilling mud, or due to transducer "aging". FIG. 5 illustrates raw data after removing ring-down 402 (e.g., referring to FIG. 4) and reflection echoes 404 may be present. This long term variation may be compensated for by iterating the workflow described in FIG. 6. A key feature of the algorithm may be that the design allows it to be applied to real-time (and to memory) data within the constraints imposed by the downhole hardware and software.

Figure 6:
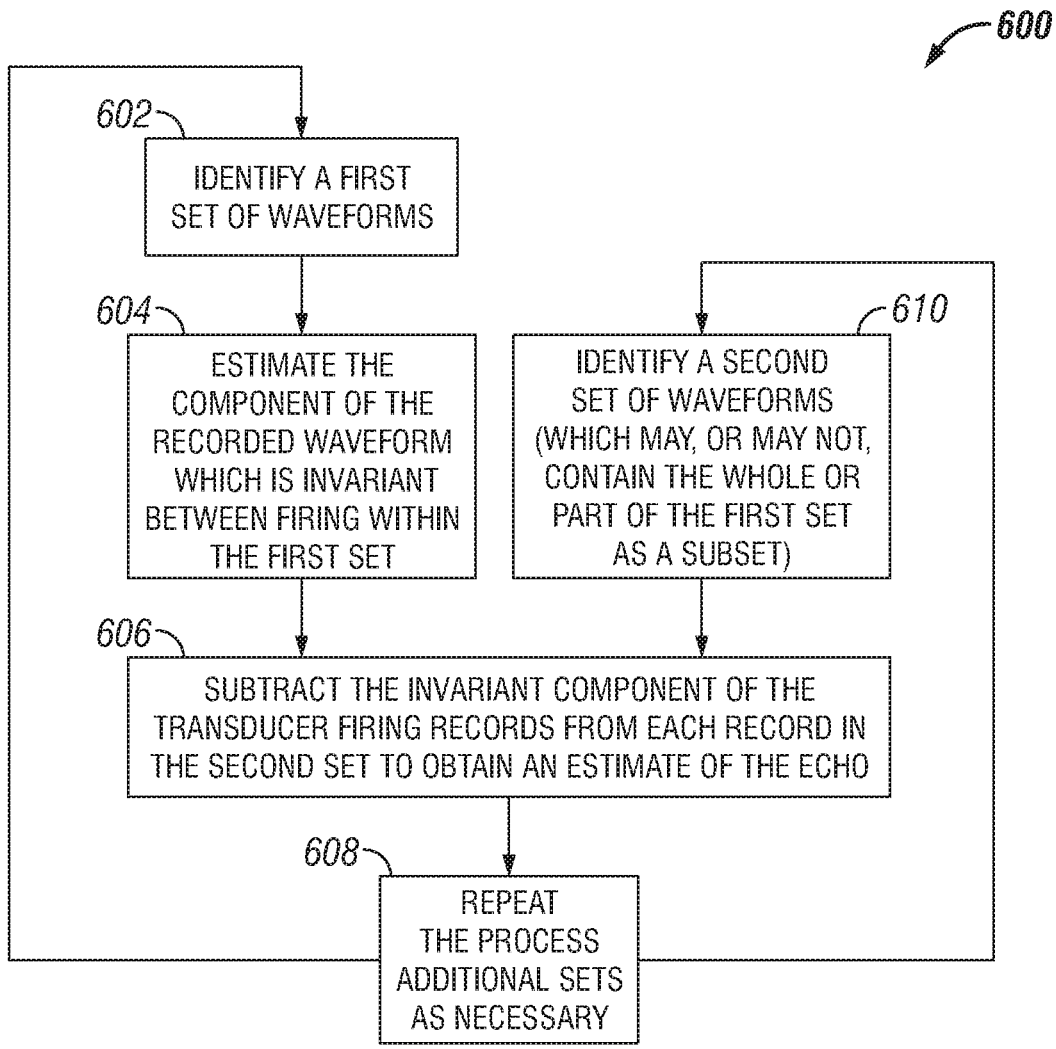
FIG. 6 illustrates a workflow for removing "ringing" from measurements taken by a transducer.

FIG. 6 illustrates an example of workflow 600 for removing "ringing" from measurements taken by transducer 136 (e.g., referring to FIG. 3). Workflow 600 may include estimating the components of the recorded waveforms, which is invariant between different firings, and subtract the invariant component from the traces. For example, workflow 600 may begin with block 602, in which a first set of waveforms may be identified. For example, each transducer 136 is treated separately from other transducers 136. Without limitation, measurement assembly 134 may start firing as soon as, or before measurement assembly 134 may be disposed in wellbore 102. The first set of firings and recordings may be the first N, which N is greater than 1,000 feet (300 meters) or 20,000 feet (6100 meters) or any other greater number. IN examples the recordings in air may be different than the recordings of firings in fluid at high pressures and depth, thus the need for iteration of workflow 600.

In block 604, the components of the recorded waveform may be estimated, which is invariant between firings within the first set of waveforms. As disclosed, each waveform $W_i(b)$ may be written as:

$$W_i(t)=R(t)+E_i(t) \quad (1)$$

Where i indicates the $i^{th}$ firing, R(t) is the transducer ringing and is invariant with respect to i, and $E_i(t)$ is the echo for the $i^{th}$ firing. Without limitation, estimating components of the firing signal may be performed by calculating a mean, calculating a median, or calculating a mode of the first set of waveforms. The estimation from block 604 may be utilized in block 606. In block 606, the invariant component of the waveforms may be subtracted from each record in the first set of waveforms to obtain an estimation of reflected echo 404 (e.g., referring to FIG. 4). For example, the invariant component may be subtracted from the same traces, traces are defined as recorded waveforms, used in calculating the invariant component, all traces acquired later in time, or all traces acquired earlier in time. Additionally, the invariant component may be subtracted from a window of traces acquired later in time (e.g. over the next 1 hour); later in firings (e.g. the next 10,000 firings); later in depth (e.g. the next 1,000 ft); over a downhole pressure or downhole temperature window (e.g. apply until the temp increase or decreases by 20 Degrees C, 100 Pa).

Reviewing the results, in block 608, the process above may be repeated for additional waveforms. For example, in block 610, a second set of waveforms is identified. In examples, the second set of waveforms may contain, the whole, one or more parts of, or none of the first set of waveforms. With a second set of waveforms, in block 606, the invariant component from block 604 may be subtracted from the second set of waveforms.

Figure 7:
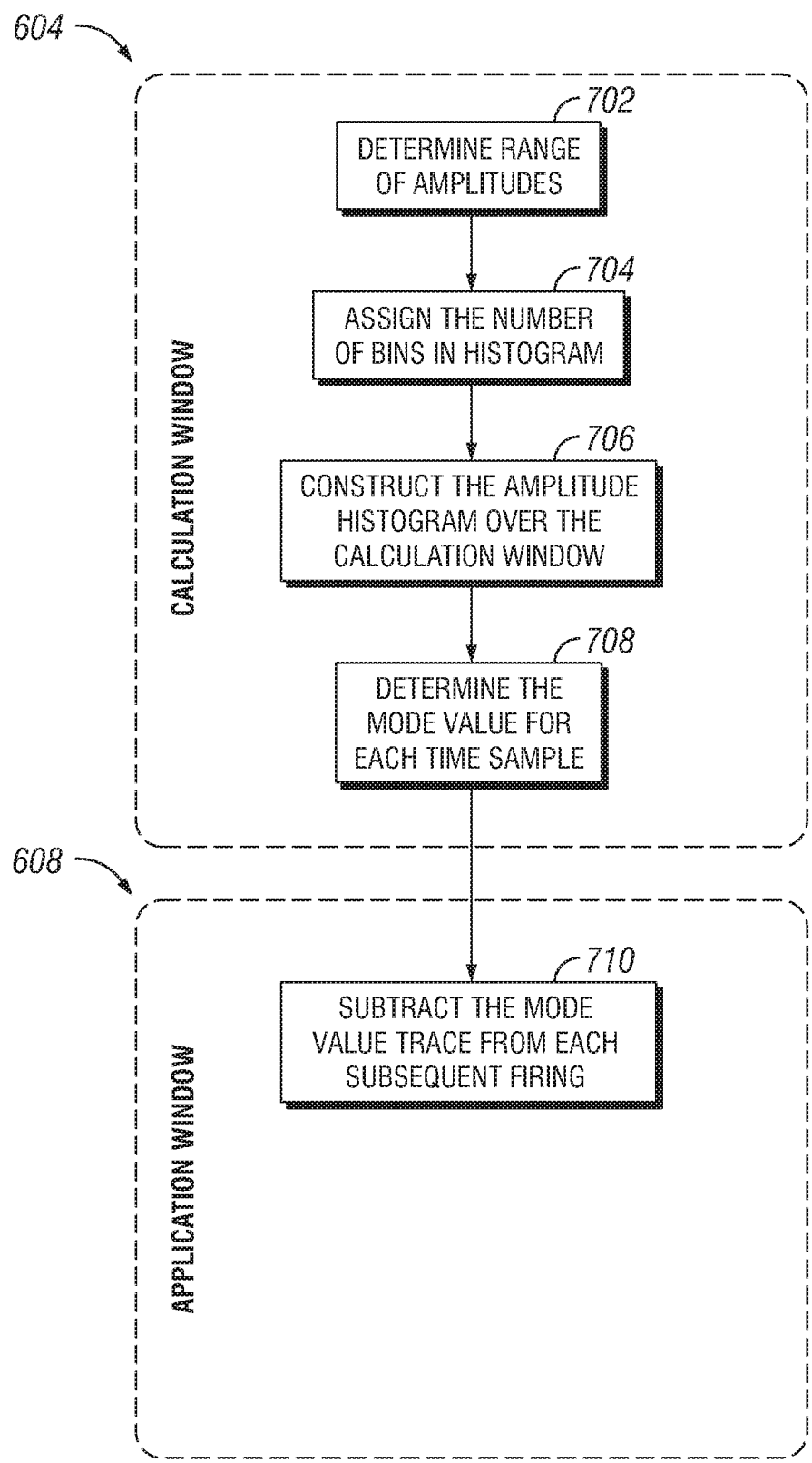
FIG. 7 illustrates a workflow for estimating a component of a set of waveforms.

FIG. 7 is an example of a detailed method for estimating a component of a set of waveforms within blocks 604 and 606. In this example, the method may be found by comparing adjacent groups of firings and look for regularities. In examples, comparing may be performed through calculating the mean for each time sample averaged over firings. In other examples, f-k filtering may be implemented with a median filter. Block 604 illustrates a method that may be utilized for any individual time sample to calculate the mathematical mode (i.e., the most frequently occurring value in a histogram) for a collection of firings. This collection may be a window of consecutive firings, or may be a regular or irregular selection of firings, determined in a deterministic or random manner. This sequence of mode values for each time sample may be defined as a "mode trace". The mode trace may then be subtracted from each data trace subsequently acquired. Block 604 may begin with block 702 where the range of amplitudes may be determined. In step 704 the number of bins in a histogram may be assigned. For example, meta-data for a histogram may be chosen (i.e., the maximum and minimum values and the number of bins). The size of each bin may be chosen to be uniform or to be variable. The histogram meta-data may be identical for each time sample, or may be different for each time sample. The latter choice may be appropriate because the amplitude of the ringing decays with time (equivalently with increasing sample number).

In step 706 an amplitude histogram over a calculation window may be constructed. In examples, a window of firings, taking each trace in turn, the value of each time sample may be assigned to the appropriate histogram bin and the histogram value for that bin incremented by one. Values falling outside the maximum and minimum values may be discarded. It should be noted that each trace may be used once and need not be stored or reloaded from memory. A trace is defined as a recorded waveform. In step 708, the mode value, i.e. the center of the bin with the highest histogram value, for each time sample may be determined. In examples, when all the traces within the defined selection of firings have been considered in turn and included in the histogram for each time sample the mode, the most frequently occurring sample value may be selected. The resulting collection of mode values for each time sample may form the "mode trace." In step 710 the mode value trace may be subtracted from each subsequent firing. For each subsequent firing trace recorded the mode trace may be subtracted before reflection echo travel-time or amplitude picking. Alternatively, the application window and the calculation window may coincide with each other, and the mode trace, once calculated, may be subtracted from each of the selection of firings that were used in the calculation of the mode trace. Blocks 702 through 710 may be repeated at multiple times during a drilling run. This may compensate for possible changes to the transducer ring-down due to changes in pressure, temperature, drilling mud properties, or aging of transducer 136. It should be noted that blocks 702 through 710 may be split into two separate sections. For example, calculation window 712 may include blocks 702 through 708 and application window 714 may include step 710.

Downhole logging tools have very limited space and power to operate in a harsh environment. This greatly limits the processing capability downhole processor can have. Workflow 700 separates the ringing removal into two steps to minimize the processing power required for a successful transducer ringing removal. The calculation window involves more computation and input/output (I/O) operations, and requires more resources than may be available downhole, making the inclusion of every trace impractical. However, it may be applied at a reduced frequency, using only a limited number of traces, compared with the application window. The application window is where the calculated ringing is being applied that need happen on all measurements. By separating these two windows the method can be effectively implemented onto downhole limited hardware resources.

Figure 8:
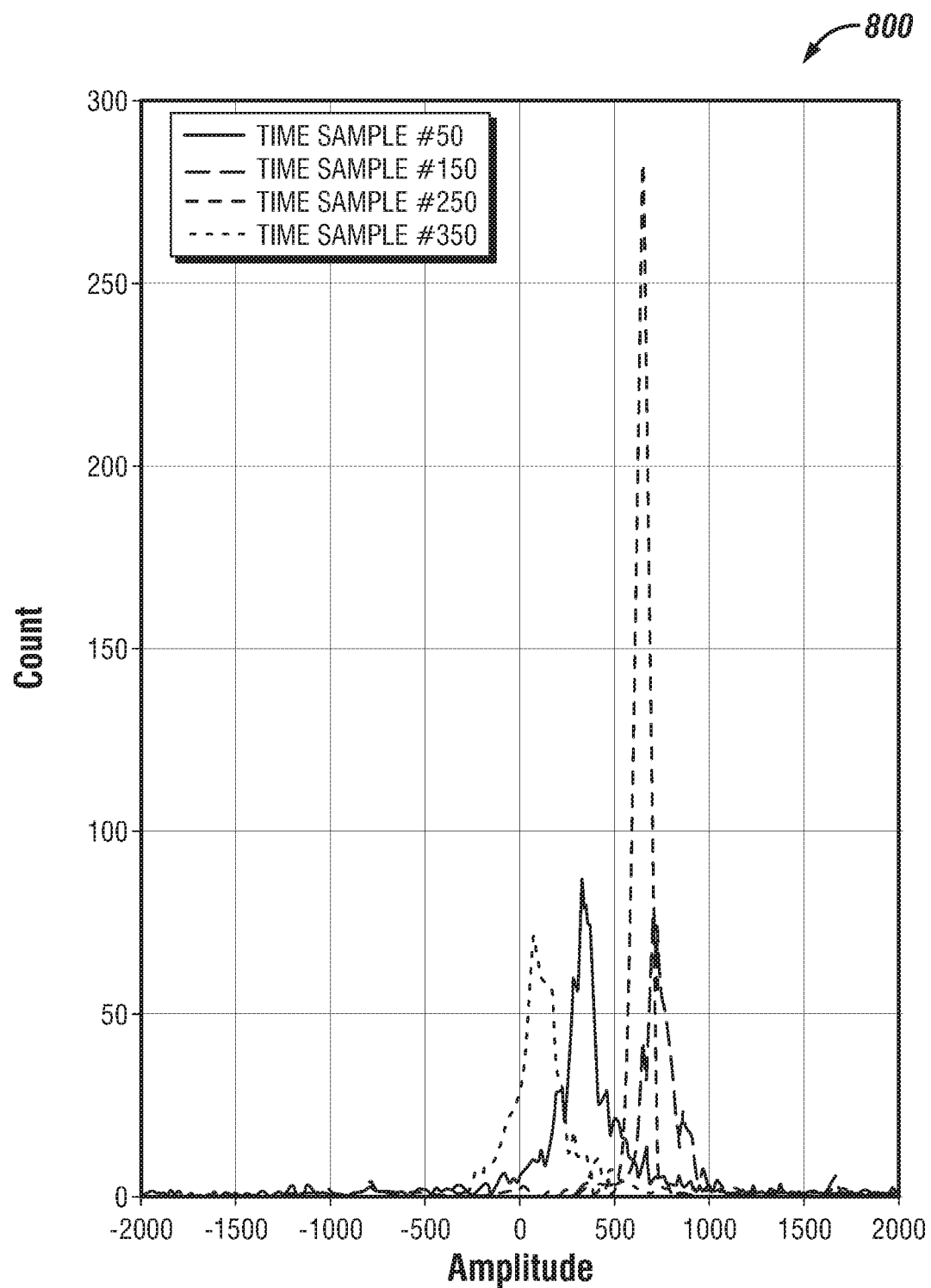
FIG. 8 is a histogram graph in accordance with particular embodiments.

FIG. 8 is a histogram 800 including selection of time samples generated over a 1,000 firing window of data shown in FIG. 4 in accordance with particular embodiments. These times samples may include portions of the data that include only noise from ring-down 402 (time sample # 50) and noise from ring-down 402 and data (time sample # 150, 250 and 350). All the histograms may be sharply peaked, giving confidence that noise from ring-down 402 may be accurately estimated.

There may be a variety of ways to choose the meta-data for the histograms, i.e. the maximum and minimum values to be recorded in the histogram and the number of bins (or the number size of the bins). For example, these may be hard-coded in the firmware based on laboratory or test facility calibration of a transducer 136 or the maximum and minimum values may be set based on the amplitude values of previous traces. In addition, fixed maximum and minimum values may be chosen for all time-samples in the trace or the values may be chosen to decrease (reflecting the fact that the ring-down decays approximately exponentially in time). Alternative, each trace could be preconditioned by multiplying it with a function that increase, exponentially or otherwise, in time, and then the maximum and minimum values of the histograms might be chosen to increase in time to reflect the fact the amplitudes of the preconditioned trace now increases with time. In addition, a single set of values may be chosen for all transducers 136 in bottom hole assembly 130 (e.g., referring to FIG. 1) or separate values may be selected for each transducer 136.

It will be appreciated by those of ordinary skill in the art, exemplary examples of the system and individual devices of the present disclosure may be used in a variety of subterranean applications, including imaging. Exemplary examples of the system and devices may be introduced into a subterranean formation and utilized to image a borehole and the surrounding formation. While the preceding discussion is directed to the use of downhole imaging, those of ordinary skill in the art will also appreciate that it may be desirable to utilize it in other types of imaging where a transducer may be used for firing and detecting a reflected signal when a target object is relatively close. For example, when the echo time is small compared to the ringing decay time. Without limitation, examples of suitable fields for this technology may be found in the marine field, medical field, non-destructive testing, borehole and ground penetrating radar, and/or the like, in accordance with examples of the present disclosure.

It should be understood that, although individual examples may be discussed herein, the present disclosure covers all combinations of the disclosed examples, including, without limitation, the different component combinations, method step combinations, and properties of the system.

Statement 1: A method for reducing transducer ringing may comprise identifying a first set of waveforms and a second set of waveforms from recorded waveforms taken by a transducer, estimating an invariant component for each waveform in the first set of waveforms, and subtracting the invariant component from the second set of waveforms.

Statement 2: The method of statement 1, wherein the first set of waveforms and the second set of waveforms are identical.

Statement 3. The method of statement 2, wherein the first set of waveforms and the second set of waveforms include all of the recorded waveforms.

Statement 4. The method of statements 1 or 2, wherein the first set of waveforms is a subset of the second set of waveforms.

Statement 5. The method of statements 1, 2, or 4, wherein the first set of waveforms and the second set of waveforms are disjoint sets.

Statement 6. The method of statements 1, 2, 4 or 5, where the first set of waveforms is at least a part of the second set of waveforms.

Statement 7. The method of statements 1, 2, or 4-6, where the second set of waveforms is at least a part of the first set of waveforms.

Statement 8. The method of statements 1, 2, or 4-7, where the second set of waveforms are acquired later in time than the first set of waveforms.

Statement 9. The method of statements 1, 2, or 4-8, where the second set of waveforms are acquired earlier in time than the first set of waveforms.

Statement 10. The method of statements 1, 2, or 4-9, where the invariant component is subtracted from a depth window, a downhole pressure window, or a downhole temperature window.

Statement 11. A method for reducing transducer ringing may comprise disposing a downhole tool into a borehole. The downhole tool may comprise at least one transducer. The method may further comprise transmitting at least two excitations from the at least one transducer into the borehole, wherein the at least two excitations are reflected off a borehole wall as waveforms, recording the waveforms as a first set of waveforms and a second set of waveforms with the at least one transducer as a sequence of amplitudes based at least in part as a sequence of time samples, identifying the first set of waveforms and the second set of waveforms from the waveforms recorded by the at least one transducer, estimating an invariant component for each waveform in the first set of waveforms, and subtracting the invariant component from the second set of waveforms.

Statement 12. The method of statement 11, wherein the first set of waveforms and the second set of waveforms are identical.

Statement 13. The method of statements 11 or 12, wherein the first set of waveforms and the second set of waveforms include all the waveforms recorded by the at least one transducer.

Statement 14. The method of statements 11-13, wherein the first set of waveforms is a subset of the second set of waveforms.

Statement 15. The method of statements 11-14, wherein the first set of waveforms and the second set of waveforms are disjoint sets.

Statement 16. A system for reducing transducer ringing may comprise a downhole tool. The downhole tool may comprise at least one transducer and wherein the at least one transducer is configured to emit an excitation and record a plurality of waveforms. The system may further comprise an information handling system configured to identify a first set of waveforms and a second set of waveforms from the plurality of waveforms from the at least one transducer, estimate an invariant component for each waveform in the first set of waveforms, and subtract the invariant component from the second set of waveforms.

Statement 17. The system of statement 16, wherein the first set of waveforms is a subset of the second set of waveforms.

Statement 18, The system of statements 16 or 17, wherein the first set of waveforms and the second set of waveforms are disjoint sets.

Statement 19. The system of statements 16-18, wherein the first set of waveforms and the second set of waveforms are identical.

Statement 20. The system of statements 16-19, wherein the first set of waveforms and the second set of waveforms include all the waveforms recorded by the at least one transducer.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for reducing transducer ringing comprising:
   identifying a first set of waveforms and a second set of waveforms from recorded waveforms taken by a transducer;
   determining a range of amplitudes from the first set of waveforms;
   form a plurality of bins for an amplitude histogram;
   construct the amplitude histogram over a calculation window;
   identify a mode value for the first set of waveforms in the calculation window;
   determining an invariant component from the mode value; and
   subtracting the invariant component from each waveform of the second set of waveforms.

2. The method of claim 1, wherein the first set of waveforms and the second set of waveforms are identical.

3. The method of claim 2, wherein the first set of waveforms and the second set of waveforms include all of the recorded waveforms.

4. The method of claim 1, wherein the first set of waveforms is a subset of the second set of waveforms.

5. The method of claim 1, wherein the first set of waveforms and the second set of waveforms are disjoint sets.

6. The method of claim 1, wherein the first set of waveforms is at least a part of the second set of waveforms.

7. The method of claim 1, wherein the second set of waveforms is at least a part of the first set of waveforms.

8. The method of claim 1, wherein the second set of waveforms are acquired later in time than the first set of waveforms.

9. The method of claim 1, wherein the second set of waveforms are acquired earlier in time than the first set of waveforms.

10. The method of claim 1, wherein the invariant component is subtracted from a depth window, a downhole pressure window, or a downhole temperature window.

11. A method for reducing transducer ringing comprising:
    disposing a downhole tool into a borehole, wherein the downhole tool comprises:
       at least one transducer; and
    transmitting at least two excitations from the at least one transducer into the borehole, wherein the at least two excitations are reflected off a borehole wall as waveforms;
    recording the waveforms as a first set of waveforms and a second set of waveforms with the at least one transducer as a sequence of amplitudes based at least in part as a sequence of time samples;
    identifying the first set of waveforms and the second set of waveforms from the waveforms recorded by the at least one transducer;

determining a range of amplitudes from the first set of waveforms;

form a plurality of bins for an amplitude histogram;

construct the amplitude histogram over a calculation window;

identify a mode value for the first set of waveforms in the calculation window;

determining an invariant component from the mode value; and subtracting the invariant component from each waveform of the second set of waveforms.

12. The method of claim 11, wherein the first set of waveforms and the second set of waveforms are identical.

13. The method of claim 11, wherein the first set of waveforms and the second set of waveforms include all the waveforms recorded by the at least one transducer.

14. The method of claim 11, wherein the first set of waveforms is a subset of the second set of waveforms.

15. The method of claim 11, wherein the first set of waveforms and the second set of waveforms are disjoint sets.

16. A system for reducing transducer ringing comprising:
a downhole tool, wherein the downhole tool comprises:
at least one transducer and wherein the at least one transducer is configured to emit an excitation and record a plurality of waveforms; and
an information handling system configured to:
identify a first set of waveforms and a second set of waveforms from the plurality of waveforms from the at least one transducer;
determining a range of amplitudes from the first set of waveforms;
form a plurality of bins for an amplitude histogram;
construct the amplitude histogram over a calculation window;
identify a mode value for the first set of waveforms in the calculation window;
determine an invariant component from the mode value; and
subtract the invariant component from each waveform of the second set of waveforms.

17. The system of claim 16, wherein the first set of waveforms is a subset of the second set of waveforms.

18. The system of claim 16, wherein the first set of waveforms and the second set of waveforms are disjoint sets.

19. The system of claim 16, wherein the first set of waveforms and the second set of waveforms are identical.

20. The system of claim 16, wherein the first set of waveforms and the second set of waveforms include all the waveforms recorded by the at least one transducer.

* * * * *